United States Patent [19]

Austin et al.

[11] 4,029,727

[45] June 14, 1977

[54] CHITIN FILMS AND FIBERS

[75] Inventors: Paul Roland Austin, Wilmington; Charles James Brine, Newark, both of Del.

[73] Assignee: The University of Delaware, Newark, Del.

[22] Filed: Apr. 16, 1975

[21] Appl. No.: 568,434

[52] U.S. Cl. .............................. 264/186; 264/202; 424/180; 536/20

[51] Int. Cl.$^2$ ......................................... C08B 37/08

[58] Field of Search ............... 260/211 R; 264/186, 264/202; 536/20

[56] References Cited

UNITED STATES PATENTS

| | | | |
|---|---|---|---|
| 2,040,880 | 5/1936 | Rigby | 264/186 |
| 2,168,374 | 8/1939 | Thor | 260/211 R |
| 2,217,823 | 10/1940 | Thor | 260/211 R |
| 2,403,251 | 7/1946 | Watson | 264/202 |
| 2,842,049 | 7/1958 | Delangre | 260/211 R |
| 3,099,067 | 7/1963 | Merriam et al. | 260/DIG. 31 |
| 3,758,660 | 9/1973 | Battista | 264/202 |
| 3,892,731 | 7/1975 | Austin | 260/211 R |

FOREIGN PATENTS OR APPLICATIONS 1,104,694   2/1968   United Kingdom ........ 260/DIG. 31

OTHER PUBLICATIONS

Chemical Abstracts, vol. 79, No. 16, 10/22/1973, p. 93, 253d.
Chemical Abstracts, vol. 79, No. 17, 10/29/1973, p. 103, 768s.

*Primary Examiner*—Ronald W. Griffin
*Attorney, Agent, or Firm*—John J. McDonnell

[57] ABSTRACT

A new method for producing high-strength films, fibers and other shaped articles from chitin has been discovered, whereby an anhydrous solution of chitin is made into the desired shape, the chitin is insolubilized with an organic non-solvent for the chitin and the resultant shaped article, if desired, is oriented, by cold drawing until its properties, such as tensile strength, are substantially enhanced. The films, fibers, and other shaped articles capable of being oriented or in oriented form, are novel and useful in such applications as food wrap and surgical sutures.

19 Claims, No Drawings

CHITIN FILMS AND FIBERS

The Government of the United States has rights to this invention pursuant to Grant No. 04-3-158-30 with the Department of Commerce.

This invention relates to films and fibers and a process of making same. This invention also relates to solutions of chitin.

Chitin is a cellulose-like material that occurs widely in nature, for example in the cell walls of fungi and the hard shell of insects and crustaceans. The waste from shrimp, lobster and crab seafood industries, now used largely for its protein values in animal feed, contains 10-15 percent chitin and is a readily available source of supply.

More specifically, chitin is a mucopolysaccharide, poly-N-acetyl-D-glucosamine and like cellulose, of relatively high molecular weight. However, in the natural state it occurs only in small flakes or short fibrous material, e.g. from the carapace or tendons of crustaceans; there is no source, as with cotton in the cellulosics, that forms useful shaped articles without solution and reprecipitation or renaturing.

For many years efforts have been made to prepare films and fibers of chitin following cellulose technology, but with limited success. Kunike, Soc. Dryers and Colourists, 42, 318 (1926), prepared chitin films and fibers by its solution in aqueous acids, spinning or casting, and subsequently coagulating with a non-solvent. Even though the filaments were dried under tension their tensile strength was only about that of rayon.

Clark and Smith, J. Phys. Chem., 40, 863 (1936), used aqueous acids or lithium salts for solution and regeneration, but the films produced were readily dispersed in water. Threads extruded from lithium thiocyanate with tension applied during their formation were said to develop orientation, but an x-ray pattern of a chitin sheet supported on a glass plate reprecipitated from lithium thiocyanate solution, showed only the broad diffuse nodes of a strained, noncrystalline material.

Somewhat later, Thor, U.S. Pat. No. 2,168,374 and No. 2,168,375, Aug. 8, 1939, described the preparation of chitin xanthate for regenerating chitin films and fibers. The patents mention the stretching of filaments in the gel state to improve physical properties, but not the drawing of solid chitin, required for fiber orientation. Thor, U.S. Pat. No. 2,217,823, Oct. 15, 1940, discloses some further details of his efforts to produce commercially useful films and fibers from chitin, but covers only homogeneous mixtures of chitin and cellulose coprecipitated from the mixed xanthates. Regenerated chitin films were said to possess good strength in the dry state, but became soft and slimy on wetting, implying a lack of toughness when wet.

Thor and Henderson, Am. Dyestuff Reporter, 29, 489 (1949) describe the preparation of regenerated chitin from chitin xanthate and summarize its properties. It formed films having a tensile strength of 9.49 kg/sq mm (dry) and 1.75 kg/sq mm (wet).

In summary, the prior art discloses attempts to produce useful articles by solution and regeneration of chitin, including stretching during fiber formation, as practiced commercially with rayon technology, but it does not teach how to carry out film or fiber preparation in such a manner as to achieve a tough renatured product capable of high orientation and possessing tensile strength, resistance to water and other outstanding physical properties comparable with native chitin, as indicated in Table 1.

Table 1

| Fiber | Ten. Str. kg/sq mm | Reference |
| --- | --- | --- |
| Natural chitin | 58 | Clark and Smith |
| Regenerated chitin | 35 | Kunike |
| Silk | 35.6 | Clark and Smith |
| Viscose rayon | 25 | Kunike |
| Wool | 14.5 | Clark and Smith |
| Film | | |
| Regenerated chitin | 9.49 | Thor and Henderson |
| Regenerated celullose | 9.10 | Thor and Henderson |

It is an object of this invention to prepare highly oriented shaped articles from chitin. Further objects are the unsupported films, fibers and other shaped articles themselves, either as cast, extruded or formed, or after having been cold drawn to achieve a high degree of orientation and substantial enhancement of their properties. A further object is to provide a method for producing the shaped articles in such a way that the chitin is laid down with a substantial portion of it in crystalline form, comparable with the well-ordered natural chitins, capable of being cold drawn to enhance its properties. Another object is to provide a superior solution and renaturing process for producing unsupported films, continuous filaments and other shaped articles from chitin, such that those articles shall have physical properties and utility substantially improved over those at the prior art, which are comprised almost wholly of amorphous chitin.

Like certain other natural and synthetic polymers, chitin may occur in amorphous, stretched amorphous, partially crystalline and unoriented, and crystalline, oriented forms. Broadly these are described as different degrees of order or organization. Fibrillar chitin, for example, from the tendons of crustaceans (Clark and Smith) is of the highest natural occurring order; it is highly crystlline as shown by double refraction along the fiber axis and the characteristic Maltese Cross with a polarizing microscope, and its x-ray pattern shows the sharp multi-nodal pattern typical of known crystalline, oriented fibers. Amorphous portions of natural chitin and most reconstituted chitins show no Maltese Cross with a polarizing microscope and only broad, diffuse concentric rings in their x-ray patterns. They may show some double refraction under a polarizing microscope arising from the strain of stretching. Similarly, there are striking differences in the specific gravity of the different forms of chitin, ranging from about 1.35 for the amorphous material to about 1.49 for the highly crystalline fibrils. There are, of course, gradations and overlap in the degree of order or organizations of the chitin, both in the natural and renatured states, and such differences are found in natural chitins even from different areas of the same animal. The distinctions are determined by a combination of physical measurements, such as those indicated above.

The problem confronting the investigator then is to devise a method for converting a solution of chitin, in which the chitin is fully dissolved or dispersed, and without order or organization, into a shaped article with a high or at least controlled degree of crystallinity and/or orientation. We have found that we can accomplish these objectives and produce products of the desired qualities by a multistage process that involves controlling the molecular structure and maximizing the properties of the chitin products. The method comprises the following steps:

1. Chitin is dissolved in a solvent comprising dichloroacetic acid or trichloroacetic acid, such as the chloroacetic acid systems at my co-pending patent application Ser. No. 418,441, filed Nov. 23, 1973, usually in combination with at least one other anhydrous organic solvent.

2. The chitin is in the solution of step 1 is coagulated or renatured, in the form of a filament, film, tube or other shape by addition of an excess of an anhydrous organic liquid which is a non-solvent for chitin.

3. The coagulated shaped object is neutralized and/or leached with an alkaline reagent, preferably in an anhydrous system, then washed with water until it is neutral, and then dried.

4. Optionally, the shaped chitin object obtained as described in steps 1, 2, and 3, is oriented by subjecting it to cold drawing in the solid state to a length at least 25% greater than its original dimension.

The following examples illustrate, but in no way limit, the practice of this invention.

EXAMPLE I

Two parts of red crab *Opilio chionecetes* chitin was dissolved in 87 parts by weight of a solvent system comprised of 40 percent by weight of trichloroacetic acid, 40 percent chloral hydrate and 20 percent methylene chloride, with mechanical agitation for a period of 30 minutes. The solution was very viscous and was filtered through wool felt. A ribbon of the solution was flowed on glass and then immersed in acetone to coagulate it. The acetone was removed and replaced with fresh acetone several times at 15-minute intervals. The clear, coagulated band had substantial tensile strength. It was neutralized and washed with a 5 percent sodium hydroxide and potassium hydroxide mixture in 2-propanol, washed with water and air-dried. The x-ray pattern of this material revealed distinct, concentric Debye rings closely similar to those of natural crystalline, unoriented alpha-chitin (Carlstrom, J. Biophys. Biochem. Cytol., Vol. 3, p. 669–683, 1957) and to the red crab flake from which it was prepared.

The above ribbon was then cold drawn with necking down, to twice its initial length. The resultant oriented ribbon could be tied into a knot and pulled tight without breaking. With further extension, breaking occurred at some imperfection rather than at the knot. This renatured, cold-drawn ribbon had an x-ray diffraction pattern of an oriented fiber, characterized by three main layer lines along the vertical axis (drawn through strong nodal points), two strong row lines laterally, and three weaker though distinct row lines that can be drawn laterally from the center through the less distinct nodal points. This pattern fits well with that of natural fibrous alpha-chitin (Rudall, K. M., Advances in Insect Physiology, Vol. I, Academic Press, New York, 1963). The cold-drawn ribbon on observation with a polarizing microscope was highly birefringent and showed extinction along the fiber axis under crossed Nicols.

Another solution of chitin prepared as described in the forepart of this example was extremely viscous and flowed very slowly to form a film, which was coagulated with excess acetone, neutralized and washed with 5 percent potassium hydroxide-sodium hydroxide mixture, in 2-propanol, and finally washed with water. The use of an alcholic system for neutralization appeared superior to an aqueous system. The film, observed under the microscope showed the presence of many fibrils in an apparently amorphous mat.

EXAMPLE II

A solution of red crab chitin was prepared by dissolving 2 parts (by weight) of chitin in 87 parts of a solvent system comprised of 40 percent (by weight) trichloroacetic acid, 40 percent chloral hydrate and 20 percent methylene chloride with mechanical agitation for 30 minutes, followed by filtration through wool felt. A portion of the viscous chitin solution was extruded through an orifice into acetone to yield a monofilament and another portion was poured onto glass in the form of a ribbon, which were then immersed in acetone. In each case the products were washed several times with fresh acetone during a one-hour period, retained acid neutralized by treating with 5 percent by weight sodium hydroxide-potassium hydroxide solution in 2-propanol at room temperature, and washed with water until neutral. The materials were subsequently extracted with methylene chloride for four hours. The samples were then tested with the results given below.

| Material | Tensile Stength kg/sq mm* | Elongation % | $N_2$ % | $Cl_2$ % |
|---|---|---|---|---|
| Filament | 63 | 13 | 5.03 | 9.45 |
| Ribbon | 104 | 44** | 5.03 | 9.45 |

*Break dimension; Instron TT-CM tensile testing machine
**Cold draw

It will be noted that the chitin retains solvent tenaciously and that even after neutralization and extraction with methylene chloride the samples contained portions of the original chitin solvents employed as indicated by their chlorine content. Nevertheless, the material could be cold drawn to give a very strong filament, which was birefringent and showed a marked nodal pattern by x-ray diffraction, indicating fiber orientation. The extruded filament was perhaps partially ordered by extrusion stress and showed lower elongation, without the striking enhancement of tensile strength induced by cold drawing.

EXAMPLE III

Two parts of red crab chitin was dissolved in 87 parts of a solvent mixture comprised of 40 percent trichloroacetic acid, 40 percent chloral hydrate and 20 percent methylene chloride. Solution was accelerated by gentle warming and stirring for 30 minutes. A very thick, viscous solution was obtained which was filtered through felt.

One portion of the chitin filtrate solution was doctored onto glass to a thickness of about one-sixteenth inch. It was immersed in acetone to coagulate and wash it, and given three successive fresh acetone washes each lasting 15 minutes. It was then neutralized and washed with a 5 percent solution of potassium hydroxide in 2-propanol and finally with water to pH of 7. The film was tough, clear and ductile, and part of it was cold drawn to two times its length. Films neutralized with aqueous potassium hydroxide appeared weaker than those prepared in an anhydrous system. Observation of the undrawn film under a polarizing microscope showed the presence of fibrillar material interspersed in a generally amorphous chitin matrix. The scanning electron microscope revealed small bundles of fibrils embedded in an amorphous mat. The drawn film, above, upon x-ray analysis, showed a marked nodal pattern very similar to that of the drawn ribbon of Example I, although not as intense.

A second portion of the above viscous chitin solution was placed in a vessel with a single fine orifice and the solution was extruded under pressure into an excess of acetone. Fine monofilaments were produced that were clear and coherent and retained their entity with both appreciable strength and elasticity. They were washed successively with acetone, 5 percent potassium hydroxide in 2-propanol, and water as described above for film preparation. The renatured chitin filaments were strong, semi-clear and easily cold drawn to two or three times their initial length. One sample, 0.5 mm. in diameter was drawn to a fiber of 0.25 mm. in diameter. The presence of moisture in the filament facilitated the cold drawing.

Examination of the undrawn extruded filament with the scanning electron microscope revealed surface striations with axial furrows, apparently a collapsed tubular structure. An x-ray analysis of the filament gave a pattern with sharp concentric Debye rings and also nodes at both the vertical and lateral positions, indicating high crystallinity together with some fiber orientation during extrusion.

EXAMPLE IV

To 87 parts of 40 percent trichloroacetic acid/40 percent chloral hydrate/20 percent methylene chloride solution, 2.0 parts of red crab chitin (*Opilio chionecetes*) were added. This chitin had been prepulverized to pass through a 24-mesh screen. This solution was magnetically stirred for 45 minutes, adding small portions of methylene chloride as the solution became too viscous to stir until 5–10 parts of methylene chloride had been added. This viscous solution was filtered free of undissolved material through felt and then through glass fiber mat. It was then immediately cast upon glass and doctored to an even thickness. After several acetone (dried with Drierite) washes, reprecipitation of clear, tough films was evident. These films had good strength, pliability and cold drawing capability. They were then extracted for 12 hours in a soxlet apparatus with equal parts by volume of methylene chloride and acetone and were then immersed for storage in acetone (dry) or dried in air for testing. These extracted, dried films maintained their good characteristics and still had cold drawing capability. The specific gravity of these films fell in the 1.46 – 1.47 g./ml. range. Elemental analysis showed that they contained 5.10 percent nitrogen and 9.54 percent chlorine. After treatment of a portion of the extracted, dried films in a boiling solution of one percent sodium hydroxide in 2-propanol, elemental analysis revealed that the nitrogen content was 6.56 percent and the chlorine content had dropped to 0.67 percent (pure chitin has a nitrogen content of 6.9 percent); the sp. gr. was 1.42 – 1.45.

Viewing the extracted, dried film under the polarizing microscope revealed a high degree of relative birefringence and the existence of Maltese Cross interference patterns, indicative of a high degree of spherulitic crystallinity.

X-ray diffraction anaylsis of the extracted, dried film gave a pattern of concentric Debye rings, visually consistent with that from the source chitin. Mathematical analysis of the d-spacings tabulated below was in good agreement with the source material, confirming that the product approached renatured chitin.

| d-Spacing (Angstroms) | | |
| --- | --- | --- |
| Red Crab Chitin | Renatured Film | Computed |
| 11.00 | 11.00 | 11.02 |
| 10.34 | 9.64 | 9.70 |
| 7.86 | 7.45 | 7.85 |
| 6.81 | — | 6.81 |
| 5.38 | 5.47 | 5.48 |
| 4.87 | 4.75 | 4.86 |
| 4.30 | 4.07 | 4.32 |
| 3.89 | 3.82 | 3.93 |

To evaluate the cold drawing properties of the extracted, dried film, a portion was cold drawn by hand, with an extension of about 85 percent. The hand-drawn film was cut into strips of constant width with a razor blade; the samples were conditioned at ambient temperature and 60 percent relative humidity and were tested for tensile strength and elongation. Based on their original dimensions, their tensile strength varied between 52–58 kg/sq mm; total elongation was approximately 125 percent which included cold drawing by hand and machine. Retesting of these totally drawn materials revealed an average tensile strength of 75 kg/sq mm with one sample at high as 95 kg/sq mm; residual elongation was about 4 percent.

EXAMPLE V

Two parts of red crab chitin, 125 parts of dichloracetic acid and 54 parts of methylene chloride were stirred intermittently for one hour at room temperature to swell and dissolve the chitin. The system became very viscous, but still contained undissolved gel particles that were removed by filtration through wool felt. The clear filtrate was flowed on glass, methylene chloride allowed to evaporate during 20 minutes and acetone added carefully to cover the thickened chitin solution without disturbing its continuity. After 15 minutes the acetone and extracted solvents were decanted and the film covered with fresh acetone. The extraction, decantation and acetone replacement was repeated; the total time of acetone extraction was one hour and the film was stored in acetone, and then dried in air. The air-dried film was treated with 2 percent aqueous sodium carbonate solution at room temperature for 30 minutes and then washed with water. The film was air dried and kept at high humidity, as moisture acts as a plasticizer for the film.

Narrow sections of the chitin film were cold drawn by hand to about 25 percent elongation and showed the following characteristics of crystallinity and orientation: some drawn sections had a dumbell shape, indicating the necking down of cold drawing; broken sections at times left tails of fibrillar chitin; drawn portions appeared more transparent than the original film; overdrawn sections whitened, indicating lack of adequate moisture and resultant inhomogeneities in the drawn film; portions toughened and curled on drawing between tight fingernails; with the polarizing microscope the drawn film showed high birefringence and parallel extinction, and imperfect Maltese Crosses evidenced by characteristic light spots in the film, indicating spherulitic crystallinity.

The examples above were selected to illustrate significant aspects of the invention, but are not to be considered limiting. Thus to one skilled in the art, many variations of the operations and choice of materials will be evident and are considered within the scope of this invention. Several such variations and alternatives are indicated herewith.

Chitin from red crabs has been used in the examples and is a so-called alpha-chitin, but it is known that chitin from other crabs, e.g., blue, rock, ring and Dungeness crabs, and from lobsters, shrimp, crayfish and other crustaceans is of the alpha type and such chitin sources may also be used to prepare the products of this invention. Chitin from other structures such as the cell walls of fungi and the hard shell of insects may be the same or of the beta or gamma type of chitin, which differ mainly in molecular spacial arrangement and only slightly in chemical structure, but since they all revert to a random structure in solution, their conversion (renaturing) to a strong film, fiber or other shaped structures makes any of the chitins, whatever their source, suitable for use in this invention. The chitins may vary slightly chemically, depending on source and method of separation from shell and proteinaceous materials, for example; such variations may include molecular weight, partial hydrolysis of the acetamide group and/or the presence of water of hydration. However, such chitins will still be insoluble in dilute acetic acid, which distinguishes them from the chitosans, obtained from chitins purposely hydrolysed to a substantial degree. Chitins of high molecular weight are preferred in carrying out this invention.

Natural chitin includes an amorphous form, associated or aggregated particles containing spherulitic crystalline material and showing the typical Maltese Cross with a polarizing microscope, fibrils having a spherulitic structure with one very long axis (showing Debye rings with $x$-ray analysis and parallel extinction under crossed Nicols with a polarizing microscope), and oriented fibers giving characteristic nodal $x$-ray patterns. There are of course overlaps and gradation in these structures. Each of these forms has its counterpart in reprecipitated or renatured chitin over a range of products including powders, unsupported film, fibrils and oriented fibers.

The specific solvents employed to dissolve the chitin are selected as a matter of convenience and economics. Although such solvents are normally dry, adventitious moisture entering the system as absorbed water in or on the chitin, or as a hydrate or azetrope of one of the solvents is frequently tolerated and may at times be advantageous. Solvents that are particularly useful in combination with the chloroacetic acids mentioned above in dissolving chitin include formic acid, acetic acid, glycollic acid, chloral, chloral hydrate, nitromethane, chlorinated aliphatic hydrocarbons such as methylene chloride and stetrachlorethane. The proportions of the chloroacetic acids in the solvent mixture can vary widely, amounts ranging from 25 percent to 80 percent by weight of the mixture are suitable. More than one auxillary solvent can be employed in the solvent mixture. Thus, for example, a mixture of 40 percent, by weight, trichloroacetic acid, 40 percent chloral hydrate, and 20 percent methylene chloride is especially preferred. The concentration of chitin in the solution can also vary widely. Solutions containing less than 0.5 percent, by weight, to 10 percent are useful. Chitin concentrations of from 1 to 5 percent are preferred.

Because trichloroacetic acid and chloral are held so tenaciously by chitin, certain after-treatments may be employed to remove them more completely, such as heating with dilute aqueous ammonia or other alkali or by soaking in such media over a long period. Alternatively, recourse may be taken by the use of other solvents for chitin such as phenol, cresol or other phenolic compound in conjunction with a chlorinated or fluorinated solvent, an amide or a sulfoxide. Some of the florinated solvents, although expensive, may be useful as chitin solvents by themselves or in conjunction with one or more of the other solvents mentioned.

Renatured connotes the reforming of chitin from its solution to a solid structure possessing to a substantial degree the organization of natural crystalline chitin. Mere coagulation or precipitation as described in the prior art, or regeneration from the xanthate as indicated in the cited references yields only amorphous chitin showing no crystal structure with $x$-rays or polarizing microscope, having a low specific gravity and incapable of being cold drawn appreciably without breaking. The stretching of a coagulating fiber may give strain and orientation as indicated by parallel extinction under crossed Nicols, but the $x$-ray pattern shows the absence of crystalline structure (Clark and Smith, 1936). Fibrous natural chitin has been described by Hackman and Goldberg, 1965, as comprising about 30 percent of crystalline, organized molecular chitin. Such measurements are not precise, but at least a few percent of such organized material is required before a renatured chitin structure can be cold drawn.

The renaturing of the chitin takes place principally in the insolubilization step using a non-solvent for the chitin. Commonly the organic solvent of the chitin is extruded or immersed in acetone or other organic non-solvent for a sufficient time to permit some degree of crystallization-organization of the chitin to take place. There is a time-temperature concentration inter-relationship here that is optimized by suitable pilot trails. It appears that the shaped article may first be case hardened, that is, a skin is formed around the inner still-soluble system and the insolubilization the crystallization-organization then proceeds by diffusion of non-solvent in through the membrane and the chitin solvent out to the excess of leaching solvent. This action, together with subsequent neutralization (if required) and drying involves some collapse of the structure within its skin because of the reduced volume, with consequent elaboration of a characteristic film or fiber morphology. Suitable coagulating agents include aliphatic ketones; e.g., acetone, methyl ethyl ketone, methyl isobutyl ketone, diethyl ketone, and cyclopentanone; chlorinated aliphatic hydrocarbons; e.g., excess methylene chloride, carbon tetrachloride, trichloroethylene, and tetrahydrofuran; hydrocarbons, e.g., cyclohexane, hexane, and petroleum ether. Alcohols such as ethyl alcohol, isopropyl alcohol, n-butyl alcohol can be used, especially after preliminary coagulation of the chitin has been obtained by means of one of the above-mentioned non-solvents.

With an acid solvent system for the chitin, a neutralization step is usually desirable. If the insolubilization in an organic solvent is essentially complete, then aqueous alkali or ammonia may be used for the neutralization. Depending on time and other processing conditions, however, it may be desirable to neutralize with a nonaqueous system such as alcoholic alkali metal hyroxide, which permits insolubilization and crystallization to continue at the same time. Salts formed during neutralization are finally leached with water to yield the salt-free chitin product. Alkaline materials are useful in the neutralization step include sodium carbonate, alkali metal hydroxides; e.g., lithium, sodium and potassium hydroxides; pyridine and ammonia. Preferably the neutralization is carried out with a 1 to 5 percent, by weight, solution of one or more alkali metal hydroxides in an aliphatic alcohol of up to four carbon atoms; e.g., methyl, ethyl, isopropyl and n-butyl alcohol.

Cold drawing is an operation commonly applied to crystalline polymers to orient them and enhance their properties. Thus polyethylene, nylon, polyethylene terephthalate and polyvinylidene chloride are all crystalline polymers capable of being cold drawn and are frequently so oriented as to develop their optimum properties for various uses. For chitin fibers, drawing may be carried out between differential speed rolls, between a snub pin or mandrel and a fiberadvancing roll, or other device that will control their elongation in uniform manner to 25 percent or more of the original length. Drawing to at least 2.0 times the original length gives objects having greatly improved properties. If desired, the filaments may be moistened or humidified with steam. The drawing may be carried out at any temperature below the decomposition point of the fiber, but is customarily drawn between 0° and 150° C. Plasticizers or humectants such as glycerol may be employed to facilitate the drawing.

With chitin film, a one-way stretch may be imparted as described for fiber, but if desired a two-way cold drawing may be carried out, for example, by means of a tenter frame. Drawing of a sheet may also be accomplished by use of a flat-iron shaped mandrel to serve as a focal point for the drawing. Alternatively, a tubing of chitin film may be blown to impart circumferential drawing and orientation, and the blown film used as such or cut to flat film.

Depending upon the nature of the shaped article of chitin, the cold drawing step may be carried out by cold rolling, extrusion and drawing through a constricting die, or by stamping.

As with the crystalline polymers mentioned above, the chitin shaped articles may be conditioned or set in predetermined form by heating them, as such or under tension or restraint in the desired form with or without the presence of moisture. In this way not only tensile strength but residual elongation, elasticity, stiffness, shrinkage, recovery from deformation, and shape can be controlled.

The pliability of the renatured chitin products can be enhanced by incorporation of plasticizers or humectants having a significant degree of compatibility with chitin. Examples of suitable materials for this use include glycerol, ethylene glycol, propylene glycol and sorbitol.

Because of their inertness to water, steam sterilization and storage conditions the films both as formed and as cold drawn are useful in food wrapping, such as sausage casings, oven products and dairy products. The undrawn films are particularly useful where the film is subjected to temporary stress. The fibers, particularly when oriented, are especially adapted to use as sewing thread and decorative fibers where their good dyeability, strength and controlled elongation are advantageous. Use of the chitin as surgical sutures has been described by L. L. Balassa, U.S. Pat. No. 3,632,754, Jan. 4, 1972, in part because of its ability to accelerate wound healing. The oriented chitin fibers of this invention are particularly suited for this purpose because of their enhanced tensile strength and elasticity.

It is apparent that changes and modifications may be made without departing from the invention in its broader aspects. The aim of the appended claims, therefore, is to cover all such changes and modifications as fall within the true spirit and scope of the invention.

We claim:
1. A cold drawn fiber, film or shaped object of renatured chitin containing crystalline chitin.
2. The cold drawn fiber, film or shaped object of claim 1 that has been cold drawn at least 25 percent of one of its original dimensions.
3. The cold drawn fiber, film or shaped object of claim 1 that has been cold drawn at least 25 percent of one of its original dimensions and has a specific gravity above 1.40.
4. The fiber, film or shaped object of renatured chitin characterized by there being present in the renatured chitin characterized by there being present in the renatured chitin renatured fibrils, crystallites or spherulites, showing (1) a Maltese Cross or birefringence with a polarizing microscope, (2) an x-ray pattern with sharp concentric Debye rings, and (3) a specific gravity above 1.40, and in an amount sufficient for said fiber, film or shaped object to be cold drawn at least 25 percent of one of its original dimensions.
5. A method of orienting a shaped object of claim 4 which comprises subjecting it to stress in the solid state.
6. The method of claim 5 wherein the stress is applied by cold drawing, cold rolling, stamping, die extrusion or blowing.
7. The shaped article made by the method of claim 6 wherein the article had been stressed to at least 1.4 times one of its original dimensions.
8. The shaped article made by the method of claim 6 having an x-ray pattern substantially identical to that of oriented fibrous natural alpha-chitin.
9. A method of orienting the shaped object of claim 4 which comprises subjecting it to stress in the solid state until it has been elongated to at least 25 percent greater than its original dimensions.
10. The method of claim 9 wherein the stress is applied by cold drawing, cold rolling, stamping, die extrusion or blowing.
11. A process for the manufacture of the product of claim 4 from natural chitin which comprises forming an anhydrous solution of chitin casting the solution into the shape desired and coagulating the chitin from the solution with an anhydrous coagulating medium to retain the shape desired and to form fibrils, crystallites or spherulites in the coagulated structure.
12. The process of claim 11 wherein the solvent consists of trichloracetic acid, a chlorinated solvent and chloral or chloralhydrate.
13. The process of claim 2 wherein the coagulated renatured chitin is treated with an anhydrous alkaline system to neutralize and/or leach out the acid solvent.
14. The process of claim 13 wherein the anhydrous alkaline system is an alcoholic alkali system.
15. The process of claim 11 wherein the chitin is precipitated from solution with a lower molecular weight ketone.
16. The process of claim 15 wherein the ketone is acetone.
17. An oriented-shaped article from renatured chitin having an X-ray pattern characteristic of an oriented fiber.
18. A shaped article of claim 17 wherein said article is in the form of a fiber, film, tubing or stamping.
19. The shaped article of claim 17 that has been stressed to at least 1.4 times its original dimensions.

* * * * *